United States Patent Office
3,087,979
Patented Apr. 30, 1963

3,087,979
METHOD FOR PREPARING TRIISOBUTYLENE
Robert Y. Heisler, Fishkill, and Howard V. Hess, Glenham, N.Y., assignors to Texaco Inc., New York, N.Y., a corporation of Delaware
No Drawing. Filed Apr. 27, 1961, Ser. No. 105,863
9 Claims. (Cl. 260—683.15)

The present invention relates to a polymerization process and, more particularly, to an improved method for producing triisobutylene.

It is known to react isobutylene in the presence of catalysts, such as sulfuric acid under polymerization conditions to produce polyisobutylene polymers. These reactions produce polymers generally characterized by having an average molecular weight but actually consisting of a mixture of polyisobutylene polymers having a wide range of molecular weights. In other words, the products of these processes consist of diisobutylene, tetraisobutylene and the like as well as triisobutylene. It is also known to react isobutylene with a fatty acid in the presence of sulfuric acid to form a tertiary butyl ester of the fatty acid. It is necessary in this reaction to maintain a relatively low concentration of sulfuric acid, generally in the range of 3 to 5%, in order to avoid or minimize polymerization to the olefin in place of the esterification reaction desired.

In polymerization, it is generally desirable to produce a polymer having a narrow range of properties. In other words, a polymer product consisting of components all within a narrow molecular weight range is more valuable than one consisting of components having a broad range of molecular weights. A product that is prepared as a specific polymer, such as triisobutylene to the substantial exclusion of other polyisobutylenes, is still more desirable and valuable since costly fractionation and other steps are obviated.

The instant process is an improved method for preparing essentially triisobutylenes. Triisobutylene is particularly useful for preparing a $C_{12}$ alkylphenol which is reacted with alkylene oxides to form non-ionic surfactants. Closely related polymers, such as diisobutylene and tetraisobutylene, or polymer mixtures containing same with triisobutylene, which are usually produced concurrently in substantial quantities in isobutylene polymerization, are far less desirable alkylating agents for this purpose.

In accordance with this invention, triisobutylene is produced by polymerizing isobutylene monomer in the presence of a mixture of sulfuric acid with a fatty acid. This reaction is critical with respect to the fatty acid employed, the proportion of the sulfuric acid to fatty acid, the sulfuric acid concentration and the temperature range for effecting polymerization.

The preparation of triisobutylene is effected in a liquid reaction medium which is actually the catalyst for the reaction. This liquid medium consists of a mixture of sulfuric acid of at least 85% concentration and a fatty acid within critical proportions.

Fatty acids, which are suitable for preparing the liquid reaction medium, are the normally liquid lower fatty acids having from 2 to 8 carbon atoms. Specific fatty acids which can be employed include acetic acid, propionic acid, butyric acid, hexanoic acid, valeric and caprylic acids. Acetic acid and 2-ethyl hexanoic acid are particularly effective for this reaction.

As noted above, sulfuric acid of at least 85% concentration rather than dilute sulfuric acid is employed in the reaction medium. Concentrated acid of 1.84 specific gravity, i.e. about 98% concentrated, is preferred. Very dilute sulfuric acid is not suitable because the reaction then loses its specificity for triisobutylene formation.

It is essential that the composition of the liquid reaction medium be within certain limits. Thus, the proportion of sulfuric acid should be 50 to 75% by weight of the reaction medium and the balance or 25 to 50% consists of the fatty acid. As progressively lower amounts of sulfuric acid are employed, the production of a t-butyl fatty acid ester is promoted. When the proportion of sulfuric acid is above the specified limits, a relatively non-specific polymerization reaction results. The preferred acid proportions for the reaction mixture are 60 weight percent of sulfuric acid and 40 weight percent of a fatty acid. A specific preferred reaction medium consists of 60 weight percent of concentrated sulfuric acid and 40 weight percent of glacial acetic acid.

It is also essential to employ a temperature in the range of 30 to 120° F. to effect the production of triisobutylene. Temperatures below the stated lower limit are relatively ineffective for this reaction. The preferred temperature range for triisobutylene production is from 40 to 85° F.

The following procedure is employed for the instant process. The liquid reaction medium consisting of sulfuric and a fatty acid is placed in a suitable reaction vessel, such as a glass flask or a glass lined reaction vessel. Gaseous isobutylene is then introduced into the liquid reaction medium to be absorbed thereby. This is preferably accomplished by passing the gaseous isobutylene through a gas addition tube having an opening below the surface of the liquid reaction medium. This reaction medium is maintained at a temperature in the range of 30 to 120° F. with a suitable cooling means while isobutylene is added and absorbed by the liquid reaction medium. As the reaction progresses, a reaction product appears as an upper layer in the reaction vessel. This layer is removed by decantation and treated for the recovery of the triisobutylene. Triisobutylene has a molecular weight of 168, a refractive index of $n_D^{20}$ 1.4315–1.4330, a bromine number of 95 and boils in the range of 340–397° F.

This process lends itself to either batch or continuous operation. For continuous operation, isobutylene monomer is continuously passed into the liquid reaction medium and the product layer which is produced as a separate layer above the reaction medium is continuously drawn off and treated for recovery of the triisobutylene.

The following examples illustrate the practice of this invention.

Example 1

400 grams of glacial acetic acid and 600 grams of concentrated sulfuric acid (specific gravity 1.84) were placed in a round bottom glass reaction vessel. This vessel was equipped with an addition tube extending below the surface of the liquid reaction medium together with a reflux condenser carrying an addition funnel, a bubbler, and a thermometer. The acid mixture or liquid reaction medium was brought to and held at temperatures between 43 and 52° F. by means of an ice-water bath. Isobutylene was added through the gas addition tube for a period of 30 minutes. During this period, an additional 43 grams of glacial acetic acid was added through the liquid addition funnel. No gas escaped through the bubbler indicating that substantially all of the isobutylene was being absorbed and polymerized. As the reaction progressed, an upper layer or reaction product built up in the reaction vessel. This product, which was essentially triisobutylene, was removed by decantation and on analysis found to have a refractive index of $n_D^{20}$ 1.4331.

The liquid reaction medium was cooled to 34° F. and isobutylene passed through for another two hour period, the temperature never rising above 45° F. The reaction product which built up as a top layer was decanted and found to be essentially triisobutylene having a bromine number of 95.

The liquid reaction medium was brought to a temperature between 80 and 93° F. while isobutylene was again passed into the system for two hours. During this period, 210 grams of glacial acetic acid was added to the reaction vessel. The reaction product, which formed as an upper layer, was separated, washed with sodium hydroxide, washed with water, and finally dried over Drierite to give a colorless liquid. On analysis, the product had a refractive index of 1.433, a bromine number of 94 and a molecular weight of 166 showing that the product was essentially triisobutylene.

*Example II*

With the same apparatus employed in Example I, above, a similar experiment was conducted with the exception that the liquid reaction medium consisted of 400 grams of water and 665 grams of concentrated sulfuric acid (the mixture consisting of about 62.5% of aqueous sulfuric acid). Isobutylene was passed into this medium at temperatures ranging from 80 to 140° F. Very little isobutylene was absorbed and no triisobutylene was formed under these conditions.

*Example III*

Using the same apparatus employed above, isobutylene was passed into a reaction vessel containing a mixture of 600 grams of acetic and 44 grams of concentrated sulfuric acid (5% by weight). The liquid reaction medium was maintained at a temperature in the range of 10° to 40° F. 635 grams of isobutylene was added to this liquid reaction medium at such a rate that a very slow stream of gas emerged from the bubbler. During the course of the reaction, an additional 300 milliliters of acetic acid was added to the reaction vessel. The reaction product was washed first with 10% sodium hydroxide and then with water followed by drying. An insignificant amount of product was recovered which boiled at 216–222° F., had a refractive index of 1.4091, a saponification number of 58.2 and a bromine number of 86.2, indicating that the product was not triisobutylene.

*Example IV*

In the same apparatus employed above, isobutylene was passed into a reaction vessel containing 600 grams of sulfuric acid and 400 grams of 2-ethylhexanoic acid maintained at a temperature of 83° F. The reaction product formed immediately as a top layer.

A portion of the reaction product was washed with 10% sodium hydroxide and with water followed by drying. The product boiled at 160–170° C., had a refractive index of $n_D^{20}$ 1.4328 and a bromine number of 91 indicating the product to be essentially triisobutylene.

Obviously many modifications and variations of the invention as hereinbefore set forth may be made without department from the spirit and scope thereof and therefore only such limitations should be imposed as are indicated in the appended claims.

We claim:

1. A method for producing triisobutylene which comprises contacting monomeric isobutylene with a liquid reaction medium, said medium comprising 50 to 75 weight percent of sulfuric acid of at least 85% concentration and 25 to 50 weight percent of a fatty acid having from 2 to 8 carbon atoms and effecting polymerization to triisobutylene at a temperature in the range of 30 to 120° F.

2. A method according to claim 1 in which said fatty acid is acetic acid.

3. A method according to claim 1 in which said fatty acid is 2-ethylhexanoic acid.

4. A method according to claim 1 in which said polymerization is effected at a temperature in the range of 40 to 85° F.

5. A method for producing triisobutylene which comprises contacting monomeric isobutylene with a liquid reaction medium, said medium comprising about 60 weight percent of sulfuric acid of at least 85% concentration and about 40 weight percent of a fatty acid having from 2 to 8 carbon atoms, and effecting polymerization to triisobutylene at a temperature in the range of 30 to 120° F.

6. A method according to claim 5 in which said fatty acid is acetic acid.

7. A method according to claim 5 in which said fatty acid is 2-ethyl hexanoic acid.

8. A method for producing triisobutylene which comprises dissolving monomeric isobutylene in a liquid reaction medium, said medium comprising 50 to 75 weight percent of concentrated sulfuric acid and 25 to 50 weight percent of glacial acetic acid and polymerizing said monomer to triisobutylene at a temperature in the range of 30 to 120° F.

9. A process according to claim 8 in which said polymerization is conducted at a temperature in the range of 40 to 85° F.

References Cited in the file of this patent

UNITED STATES PATENTS 2,041,193    Lee _____ May 19, 1936